United States Patent Office 2,847,395
Patented Aug. 12, 1958

2,847,395

STABLE HEAT-CURING EPOXY RESIN COMPOSITIONS

Robert L. Wear, West St. Paul, Minn., assignor to Minnesota Mining & Manufacturing Company, St. Paul, Minn., a corporation of Delaware No Drawing. Application June 13, 1955
Serial No. 515,229

14 Claims. (Cl. 260—47)

This invention relates to normally stable, thermosetting resinous compositions and more particularly to thermosetting epoxy resin compositions which remain in the uncured state indefinitely at normal room temperatures and yet rapidly cure to a hard, tough, infusible state at moderately elevated temperatures.

Typical epoxy resins are those which are produced by the reaction of one or more mols of epichlorhydrin or glycerol dichlorhydrin with a mol of bisphenol A in the presence of a base such as sodium hydroxide and at elevated temperatures within the approximate range of 50°–150° C. The resinous glycidyl polyether obtained from epichlorhydrin and bisphenol A is a complex mixture rather than a single chemical compound, which has been represented by the following general formula:

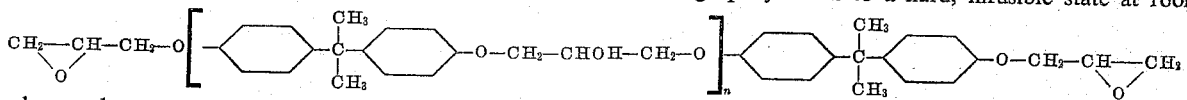

where $n$ has an average value between zero and about seven, depending for the most part on the relative proportions of bisphenol A and epichlorhydrin in the initial reaction mixture. A number of these epoxy resins are commercially available such as the Epon resins of the Shell Chemical Corporation, the Araldite resins of the Ciba Company and certain Bakelite resins of the Union Carbide and Carbon Corporation. These resins vary from the liquid state at ordinary room temperatures, for which $n$ in the above formula approaches 0, to high molecular weight solids having melting points well above 100° C.

Other polyhydric phenols, e. g. resorcinol or 2,2-bis-(4-hydroxy-phenyl) butane, as well as various trisphenols, may be substituted for the bisphenol A.

Other polyhydroxy compounds such as glycol or glycerol may be reacted with epichlorhydrin in the presence of boron trifluoride catalyst and the product converted with certain alkaline reagents to the liquid or resinous glycidyl polyether, having utility in the practice of this invention.

The chlorhydrin component likewise may be replaced by other compounds serving as equivalent reactive sources of epoxy radicals.

In all cases, the epoxy resin contains an average of more than one epoxy group,

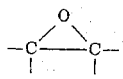

also called the oxirane group, per average molecular weight. Other liquid or resinous materials in which the average number of epoxy linkages per average molecular weight exceeds one have been produced by suitable treatment, e. g. with hydrogen peroxide and formic acid, of unsaturated materials such as soy bean oil, copolymers of butadiene with styrene, acrylonitrile, or acrylic acid, etc.; and these materials likewise, e. g. in admixture with the epoxy resins, have utility for the purposes of the invention. The preparation of these and equivalent epoxy-containing materials has been adequately described elsewhere and forms no part of the present invention.

Epoxy resins as described are by themselves permanently thermoplastic and ordinarily require the addition of cross-linking agents or other reactive materials before they can be cured to hard, infusible resinous products. The chemical hardening agents may react with the epoxy resins at their epoxy groups or the reaction may involve the hydroxyl groups, or both. A number of chemical hardening agents for epoxy resin are known including organic acid anhydrides such as maleic, pyromellitic, phthalic or hexahydrophthalic anhydride; amines, such as diethylamine or diethylene triamine; and other agents including di-isocyanates, urea-formaldehyde resins, dicyandiamide, glyoxal, aromatic polysulfonic acids, etc. Because the reaction between the epoxy resin and the hardening agent may proceed rather slowly, small amounts of activators are sometimes included in the reactive composition, for example, alkali phenoxides, Friedel-Crafts type catalysts, and various amines, particularly tertiary amines.

The chemical hardening agents are generally used in amounts equivalent to the free epoxy groups in the epoxy resin. Where the resin contains hydroxyl groups which enter into the reaction, curing may be effected with somewhat lesser amounts, although usually with some decrease in the strength of the resulting cured resinous product.

While some of the hardening agents are capable of advancing epoxy resins to a hard, infusible state at room temperatures in a very short time, in most cases some heat must be supplied in order that the reaction proceed to completion in a reasonably short time. However, all thermosetting epoxy resin compositions heretofore known, including those which cure rather slowly except at considerably elevated temperatures, are to some extent unstable at room temperatures and will eventually increase in viscosity to an extent rendering them unsuitable for normal use. The shelf life, or period of time for which such compositions could be stored at normal room temperatures and remain serviceable for their intended uses, has been in some cases so short as to require the marketing of the composition in two parts for mixing shortly before use. Such two-part systems inevitably involve waste arising out of disruptions in production and miscalculations of requirements.

Some epoxy resin compositions have been developed which have a substantial shelf life and yet can be cured to a hard, infusible state at moderately elevated temperatures in a reasonably short period of time. However, many commercial applications require that the compositions be heated to some temperature short of the desired curing temperature in order to provide a desired consistency for use, e. g. in the impregnation of porous sheet material. The pot life or period of time for which they can be maintained at such temperature and consistency is in many cases too short. The problem is complicated by the fact that the curing reaction of most epoxy resin compositions is exothermic.

Considerable research has therefore been directed toward obtaining a thermosetting epoxy resin composition which can be heated to the temperature required for a particular impregnating, coating or other operation, and subsequently cooled to room temperature without rendering it unsuitable for future use.

This invention deals with the discovery of a class of curing agents which, combined with epoxy resins, provide resinous compositions with an unusual combination of attributes including prolonged shelf life, long pot life at advanced temperatures, the capability of being heated to operating temperatures and subsequently cooled substantially without curing, and yet rapidly curing to hard, infusible products at moderate temperatures. This class of curing agents includes polyfunctional organic compounds which may be represented by the following formula:

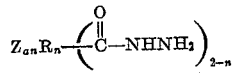

wherein R is a polyvalent organic radical having $v$ valences, $n$ is a member of the group consisting of zero and the integer 1, each Z is a member of the group consisting of the amino, hydroxyl, and carboxylic acyl hydrazide radicals, and $a$ is equal to $v-1$. A preferred group of compounds includes those having at least two —$NH_2$ radicals, at least one of which is a part of a carboxylic acyl hydrazide radical. Especially valuable are the dihydrazides.

In addition to possessing the advantages of latent curing agents, this class of materials reacts with epoxy resins to produce cured products which are in general equal or superior in quality to the reaction products of epoxy resins with any other known hardening agent. The hydrazide-epoxy resin compositions have already been proved to have considerable commercial value, as coatings, adhesives, potting compounds, castings, and laminates or reinforced products.

A one-part thermosetting resin composition has tremendous commercial significance as compared to two-part systems of resin and hardener. A one-part system eliminates time-consuming measuring and mixing operations at the point of ultimate consumption, the dangers involved in errors in measuring or lack of thoroughness in mixing, and the waste involved in mixing overly large quantities. As compared to other one-part systems, the prolonged shelf life possessed by the compositions of this invention eliminates the need for close inventory control and the dangers of schedule deviations.

An important additional property evidenced by the compositions of this invention is the complete absence of odor in the cured resinous products at room temperatures. At elevated temperatures, a slight, but not unpleasant odor may be present.

Hydrazides are readily prepared in very high yields by the reaction of carboxylic acid esters with hydrazine hydrate in concentrated alcoholic solution. The esters in turn can be prepared in excellent yields from carboxylic acids using sulfuric acid as a catalyst and toluene as a water entrainer. As an example, the equations for the preparation of adipyl dihydrazide from adipic acid are as follows:

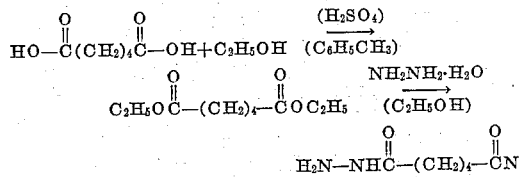

The preparation of aromatic hydrazides can proceed from aromatic carboxylic acids in the same manner. Polyfunctional compounds having other than two hydrazides are similarly prepared from carboxylic acids having a like number of carboxyl groups and, in the case of monocarboxylic acids, at least one other functional group reactive with an epoxy group.

In utilizing dihydrazides as hardening agents for epoxy resins in the practice of this invention, it has been found to be preferable to cure the epoxy resins using the proportion of ¼ mole of dihydrazide per epoxy equivalent of the resin. Apparently each of the four terminal hydrogens in the dihydrazide reacts with an epoxy group to effect cross linking of the resin. Where other reactive groups are present in the hydrazide, these are believed to react with the epoxy resin in the same manner as would the same group in a compound containing no hydrazide radical. For example, good results are obtained in curing epoxy resin using ⅓ of a mole of the hydrazide of para-hydroxybenzoic acid per epoxide equivalent.

In order to obtain strong, homogeneous cured products in the practice of this invention, it is advantageous that the hydrazide be thoroughly dispersed into the epoxy resin in a finely divided state. In early work with hydrazides as curing agents, considerable difficulty was encountered in obtaining homogeneous cured products. Even if the hydrazide was thoroughly pulverized before being added to the resin, it had a tendency to flocculate when mixed with the resin and unless the mixing was very thorough, the dihydrazide tended to precipitate before the composition could be cured. It was later found that a good blend of the hydrazide and resin could be more readily obtained by warming during mixing, and surprisingly, heating could be continued for prolonged periods without significant reaction.

Either during mixing or subsequently while being held ready for use, heating of the uncured mixture of epoxy resin and curing agent can be continued for a period of time which is dependent on the temperature interval between that being maintained and that at which active curing occurs. The choice of temperature is to be made, therefore, upon the basis of a viscosity which will be sufficiently low for the purpose and a temperature which is not so high as to initiate an exothermic curing reaction. At any time before curing has advanced excessively, it is feasible to cool the uncured mixture to room temperature and, after a prolonged period, to reheat and cure the mixture as if it were freshly prepared. As is illustrated, this property makes possible a broad flexibility of operation.

While the hydrazide-epoxy resin compositions of this invention cure rapidly at temperatures sufficiently low for most purposes, it may be desired either to lower this temperature or to speed up the rate of cure. To do this, certain activators may be included in the compositions in catalytic quantities. Some activators have been found which apparently do not destroy the property of prolonged shelf life, but it appears that in most cases the pot life is substantially shortened. One such activator consists of equal parts by weight of lead octoate and the product obtained by reacting together equal molar quantities of zinc octoate and diethylaminopropylamine.

One of the valuable features of the compositions of this invention is that after hydrazide-epoxy resin composition is fully cured, it can be heated to surprisingly high temperatures without noticeable degradation. Adhesive compositions, for example, have excellent high temperature performance retaining full strength to about 150° C.

The invention will now be illustrated by means of a number of examples showing the reactions of various hydrazides and epoxy resins and some of the uses which may be made of products of the reactions. In most cases, the epoxy resins used are the commercially available resins prepared from bisphenol A by reaction with epichlorhydrin. Among these resins are the "Epon" resins designated by the numbers 828, 834 and 864 and the "Bakelite" resin BR-18774, which designation is stated by the manufacturer to be superseded by ERL-2774. Except where noted, the dihydrazides are used in the proportion of ¼ mole per epoxy equivalent of the resin, that is, in an amount equivalent to the free epoxy groups in the resin; and the other hydrazides are also used in equivalent amounts as described hereinbefore.

The lower melting epoxy resins are for the most part preferred in that the cured products obtained therefrom have a higher heat distortion point; and for this reason, the examples do not include high melting resins. However, it is not intended to so limit the scope of the invention, the examples being included merely for purposes of illustration. It should be noted that where the uncured resinous composition is used to coat a cloth tape which is to be cured at some future time, the use of normally liquid resins is undesirable in that the uncured tape product is tacky and difficult to handle. For such uses, the Epon resin 864 which melts at about 43° C., as determined by the Durrans' mercury method, allows a tape to be produced having only a slight tack. By the same token, some applications will make preferable the use of even higher melting epoxy resins.

*Example I*

Sebacic acid dihydrazide was prepared by adding in one-half hour 52 grams of diethyl sebacate to a mixture of 48 grams of 85% hydrazine hydrate in 50 ml. of absolute ethanol held at about 70° C. This magma was warmed at about 75° C. for four hours, cooled to about 5° C. and the white crystalline dihydrazide was collected. The material weighed about 42 grams and showed a melting point of about 185° C.

The dihydrazide was then finely pulverized and a 1.45 gram sample thoroughly mixed with 5 grams of an epoxy resin having a melting point as determined by the Durrans' mercury method of about 10° C. and having about 0.5 epoxy group per 100 grams of resin, in this case the Epon No. 828 resin. That is, the hydrazide was in approximately the ratio of ¼ mole per epoxide equivalent of the resin. This liquid mixture was held at 120° C. for 1.5 hours without noticeable increase in viscosity or other evidence of reaction. When the temperature was raised to 165° C., the mixture gelled in 5 minutes and was fully cured in about one-half hour or less.

Another sample of this mixture was stored at room temperatures for more than four months without an observable change in viscosity even though the temperature often rose to about 95° F. during the period.

*Example II*

Adipyl dihydrazide melting at about 180° C. was prepared in 95% yield by reaction of dimethyl adipate with hydrazine hydrate in absolute ethanol by the procedure followed in preparing the dihydrazide of Example I. A finely divided, 1.3 gram (.0075 mole) sample of the dihydrazide was blended with 10 grams of an epoxy resin melting at about 43° C. and having an epoxide equivalent of about 0.3 per 100 grams of resin, in this case Epon No. 864 resin, and the mixture warmed sufficiently with stirring to dissolve the dihydrazide in the resin. After heating for one-half hour at 165° C., the composition was well cured as evidenced by a hardness reading of 85 at 165° C. on the A–2 scale of a Shore durometer.

A second sample of a mixture of adipyl dihydrazide-epoxy resin blend was heated at 100° C. By means of a Brookfield viscometer, using a #4 spindle at 30 R. P. M. it was found that the viscosity changed from 25 poises to 80 poises at about 110° in about 150 minutes. A liquid of this higher viscosity is still suitable for most purposes, e. g. coating operations.

Adipyl dihydrazide has been successfully applied as a hardening agent for epoxy resin in the manufacture of glass-reinforced resinous structural material. The adipyl dihydrazide-epoxy resin composition was placed in a dip pan which was heated to about 85–95° C. to give the resinous composition a flowable consistency. A large number of substantially linear glass filaments of hair-like fineness were fed under tension through the dip pan and then passed through squeeze rollers to shape the reinforced web thus created into a wide sheet comprising about 60 percent by weight of glass filaments. The reinforced web, upon leaving the rollers, quickly cooled to a slightly tacky consistency sufficient to adhere it to a paper liner having a low adhesion coating. The web and liner were then rolled together for convenient storage or shipment. The web remained in a flexible, slightly tacky, uncured state for a period of several months after which it was formed into panels of selected sizes and shapes as laminates of a number of layers of sheet material and cured under pressure and at about 165° C. for one-half hour.

It was determined that the adipyl dihydrazide-epoxy resin composition had a pot life of at least about 3 hours at 95° C. with a relatively large batch in the dip pan. This pot life is deemed satisfactory for most purposes, and the temperature can be lowered somewhat for longer pot life without ill effect on the reinforced resinous web.

Previously used epoxy resin compositions required either that the rolls of reinforced sheet material be used very shortly after being prepared to prevent their advancing to a state rendering them unsuitable for further processing or that they be kept under refrigeration. Even when refrigerated at about 5° C., the rolls had to be used within two or three months to obtain satisfactory results. However, rolls of the glass-reinforced adipyl hydrazide-epoxy resin composition which have at the date of this application been stored at room temperatures for over six months without any noticeable change in state readily cure to a hard, infusible state at 165° C.

*Example III*

Azelayl dihydrazide when mixed with the epoxy resin of Example II, Epon 864, in the proportion of ¼ mole dihydrazide per epoxy equivalent cured the resin at 165° C. The sample showed a hot hardness of 89 on the A–2 scale of the Shore durometer after one-half hour.

Another sample of the mixture was stored at ordinary room temperatures for more than four months without undergoing any observable change in state.

*Example IV*

A mixture of an epoxy resin having a melting point as determined by the Durrans' mercury method of about 9° C., e. g., BR–18774 resin, and equal parts by weight of adipyl and azelayl dihydrazide, in the proportion of ¼ mole of dihydrazides per epoxy equivalent, was warmed to about 65° C. to give it a spreadable consistency and coated on glass cloth which was then wrapped around a glass bottle. One sample was cured for 15 minutes at 160° C. and was found to be firmly adhered to both the cloth and bottle. The cured resin was rigid and strong.

A second sample of 5 pounds of the resinous mixture was held at 65° C. for 16 hours, cooled to room temperature, and later reheated to 65° C. without any observable change in properties including its ability to be spread on cloth tape.

A third sample was placed in a bottle and after more than eleven months at room temperature showed no signs of having advanced in cure. After eleven months, a sample was cured for one-half hour at 150° C. in an aluminum dish to a hard, tough solid. The cured resin was strongly anchored to the aluminum.

Mixtures of the adipyl-azelayl dihydrazide blend and the epoxy resin were prepared in varying proportions to test the effect of deviations from equivalent amounts of dihydrazide and epoxy resin. It was determined that a small casting prepared using a ratio of 4 mols of dihydrazide to 16 epoxy equivalents of resin was superior to others prepared with equivalent ratios of 3:17 and 5:15 in regard to strength, toughness and freedom from bubble formation. However, the casting prepared using $3/17$ of a mol of the dihydrazide blend per epoxy equivalent of the resin was of almost equal quality to that prepared at the 1:4 ratio, and compositions prepared in less than equivalent ratios may be preferred for some applications due to the higher cost of the dihydrazide as compared to epoxy resins.

Example V

A five-gram sample of the resin of Example IV, BR–18774, was mixed with 0.95 gram of succinyl dihydrazide, and the mixture was cured at 165° C. for one-half hour. A rigid casting was obtained which contained some bubbles.

A second sample of the mixture was held at 120° C. until a gel was obtained after which the temperature was raised to 160° C. for one-half hour. This casting was virtually bubble-free.

Example VI

By allowing a mixture of malonyl dihydrazide and Epon 864 resin to gel at about 120° C. before curing at 165° C., a casting was obtained having a few occluded bubbles. Samples of the same mixture which were cured at 165° C. without an initial period at a lower temperature produced castings containing a substantially larger number of bubbles.

Example VII

A mixture of ¼ mole oxalyl dihydrazide and an equivalent amount of epoxy resin, BR–18774, was raised directly to 165° C. and cured for two hours. The casting obtained was clear and free from bubbles.

Because of the ease of obtaining bubble-free products using this mixture and other mixtures employing dihydrazides in which the hydrazide radicals are separated by at least four carbon atoms, as contrasted to the tendency toward bubbling encountered in the previous two examples, oxalyl dihydrazide together with the longer chain dihydrazides comprise a preferred class of curing agents for epoxy resin.

Example VIII

Hexahydroterephthalyl dihydrazide was obtained from the ester of the corresponding dicarboxylic acid. Ten grams of Epon 864 resin were cured with 1.5 grams of the dihydrazide by heating at 165° C. for one-half hour. The cured resin showed a hot hardness of 85 as determined by the A–2 scale of the Shore durometer. The uncured mixture is stable at ordinary room temperatures.

Example IX

The dihydrazide of isophthalic acid was prepared by adding a solution of 38.8 grams of diethyl isophthalate in about 150 ml. of absolute alcohol to 47 ml. of hot hydrazine hydrate. Heating was continued for about an hour after the appearance of the finely divided insoluble dihydrazide which was obtained in 34 gram yield as a crystalline substance having a melting range of about 215°–250° C. On heating a dispersion of this dihydrazide with Epon 864 to 100° C. for two hours, its viscosity as determined with a Brookfield viscometer increased from about 40 poises to about 82 poises. Most of the increase in viscosity occurred toward the end of the period.

Twenty-five parts of the isophthalyl dihydrazide were thoroughly blended with 100 parts of the epoxy resin ERL–2774, a new designation for resin BR–18774 of Union Carbide and Carbon. Castings were made and cured by heating for 18 hours at 120° C. followed by one hour at 165° C. and subjected to a number of ASTM standard tests, yielding the following data:

| | |
|---|---|
| Tensile strength (p. s. i.) | 7500 |
| Percentage elongation | 2.7 |
| Compressive strength (p. s. i.) | 49000 |
| Flexural strength (p. s. i.) | 8710 |
| Impact resistance (ft.-lbs./in. notch) | 0.20 |
| Heat distortion point (° C.) | 143 |
| Hardness (Rockwell "L") | 121 |

A blend of isophthalyl dihydrazide and the liquid epoxy resin BR–18774 with powdered silica as a filler for viscosity control was evaluated as a structural adhesive by a test defined in U. S. Government specification MIL-A-5090B for Airborne Structural Metal-to-Metal Adhesives. The test specifies that a pair of one inch wide, .064 inch thick, type 24ST3 "Alclad" aluminum strips be bonded with a one-half inch overlap and subjected to a steady, longitudinal pull. While this is initially a simple shear test, the aluminum test strips bend as the load increases so that the test becomes a measure of the peel resistance and brittleness of the bond as well as of adhesion and tensile strength. The test is uniformly accepted in the aircraft industry with the requirement that a given adhesive withstand a pull of 2000 or 2500 pounds per square inch over a stated range of temperatures. Few previously known adhesives retain such strength when heated above 100° or 125° C. that do not become brittle in the subzero range.

A mixture of 100 parts of the BR–18774 resin, 25 parts isophthalyl dihydrazide, and 5 parts powdered silica was freshly prepared and applied to clean aluminum test strips and cured in a heated platen press at 175° C. for one hour under about 25 pounds per square inch pressure to insure a complete uniform adhesive layer between the panels and after cooling was tested for tensile shear strength in accordance with the above-described procedure. A second sample was stored at room temperature for three months and then subjected to the same test. The results of the tests are as follows:

| Shear strength in p. s. i. at— | Fresh Sample | After 3 Months |
|---|---|---|
| −55° C | 2,730 | 2,940 |
| Room temperature | 2,950 | 3,080 |
| 95° C | 3,640 | 3,825 |
| 150° C | 3,265 | 3,180 |

Other samples of the same adhesive batch were tested for viscosity over a period of time using the Brookfield viscometer with a #7 spindle at 4 R. P. M. at 72° F. The following viscosities in poises were obtained:

| | |
|---|---|
| Fresh sample | 1200 |
| After 2 months | 2700 |
| After 3 months | 3300 |
| After 6 months | 4000 |

After 3 months the composition still spread very nicely, but in 6 months it was only difficultly spreadable at 72° F. However, a readily spreadable composition was obtained by heating a sample to about 85° F. and a well-cured adhesive bond was obtained by heating in the press at 175° C. for one hour.

Example X

A mixture of 45.7 parts by weight of Epon 864 resin, 7.2 parts Epon 834, 37.4 parts of finely divided mica, 0.9 part of Benton–34 (a product of the National Lead Company consisting of 90% aluminum silicate and 10% organic material) as thixotropic agent, and 0.8 part iron oxide pigment was combined in a rubber mill with 8.0 parts of isophthalyl dihydrazide. A first sample held at 50° C. for three days advanced somewhat, but upon raising the temperature it flowed easily. A second sample was held at 65° C. for three days, during which time it increased considerably in viscosity; but when the temperature was raised, it still flowed easily, and then cured at 150° C. in 13 minutes to a hard product. Castings were obtained which withstood heavy blows with a hammer and which were resistant to common organic solvents. A casting held for 30 hours at 235° C. showed no observable degradation.

A blend of isophthalyl dihydrazide and Epon 834 resin in equivalent amounts was heated to 95° C. in a dip pan and used to impregnate non-woven, lineally aligned glass fibers to produce a flexible, thermosetting sheet material by the procedure outlined in Example II. This dihydrazide-epoxy resin blend was found to have a pot life of at least about 3½ hours at 95° C. Rolls of tape thus made using this composition have been stored at room temperature several months with no change in state and are readily curable at any time to a hard, infusible state by heating to 165° C. for one-half hour.

*Example XI*

Castings made from a dispersion of 8.4 parts isophthalyl dihydrazide, 54.6 parts Epon No. 864, and 34.1 parts of powdered mica were cured for 2 hours at 140° C., and after cooling, were subjected to ASTM Arc Resistance Test D495–48T. From 10 samples, an average value of 85 seconds was obtained, a superior value for a dielectric.

A similarly prepared composition of 51.2 parts Epon 864, 9.1 parts Epon 834, 9.1 parts isophthalyl dihydrazide, 29.5 parts powdered mica, and 1.1 parts iron oxide pigment was warmed to a spreadable consistency, knife-coated on glass cloth, and cured at the same time and temperature. A number of samples were heat aged for 10 days at 240° C. Their weight loss averaged about ten percent. Another cured sample of this formulation yielded a Barcol hardness of 45 and yet was tough enough to withstand heavy blows with a hammer.

Another sample of this composition was warmed to about 65° C. to attain a spreadable consistency, knife-coated on glass cloth, allowed to cool, and then stored at room temperature. After almost seven months' storage at room temperatures, this tape was wrapped on a copper wire, then cured by heating in an oven for one-half hour at 150° C. followed by 16 hours at 95° C., and tested for dielectric strength. A 15 mil thickness withstood 15,000 volts or 1000 volts per mil, a high dielectric strength. Surprisingly, the voltage resistance of this aged sample was somewhat higher than the best of a number of samples prepared from freshly coated material and similarly tested.

The cured resinous product of the composition: 55.0 parts Epon 864, 3.0 parts Epon 834, 32.5 parts powdered talc, 1.0 part iron oxide pigment and 8.5 parts isophthalyl dihydrazide was subjected to a room temperature water absorption test following the procedure set forth in ASTM test D570–42. It exhibited an 0.18 percent gain in weight in 24 hours which is quite low. Another sample was subjected to ASTM heat distortion test D647–41T. The distortion point was 138° C. which is quite high for a cured resin. For purposes of comparison, the same resinous composition with phthalic anhydride substituted for the isophthalyl dihydrazide yields a cured product having a heat distortion point of about 110° C.

*Example XII*

Ethyl 5-nitro-isophthalate was reduced to the amino compound with iron and hydrochloric acid in alcohol-water and the resulting ester converted to 5-amino-isophthalic dihydrazide melting at about 280° C. by procedures analogous to those used above. This hydrazide was employed to cure the Epon resin 834. The amount of hydrazide was in approximately the ratio of one-sixth of a mole per epoxide equivalent, and powdered talc was added as a filler. The mixture showed no evidence of reaction at room temperature and the temperature had to be maintained at 165° C. for about one-half hour before a gel was obtained. After two hours at that temperature the resin was cured but remained somewhat flexible at 165° C. Further curing at 165° resulted in a resin which was rigid at that temperature.

*Example XIII*

The crystalline para-aminobenzhydrazide which melted at 220° C. was found to cure BR–18774 resin effectively at elevated temperatures when used in theoretical proportion: ¼ mole of the hydrazide per epoxy equivalent of resin. The mixture is stable at room temperature.

*Example XIV*

Five grams of BR–18774 resin were blended with 1.1 grams of the hydrazide of 2,4-dihydroxybenzoic acid, a crystalline substance melting at about 245° C. by mixing together at room temperature. Using a 165° C. cure, a satisfactory casting was obtained which was rigid at 120° C. but somewhat flexible at 165° C. There was no sign of curing of the mixture at room temperatures.

*Example XV*

A blend of ⅓ of a mole of para-hydroxybenzhydrazide, which melts at about 263° C., per epoxy equivalent of BR–18774 resin was found to produce a well-cured casting. This blend can be stored at room temperatures indefinitely without curing.

*Example XVI*

A dark casting was obtained by heating a mixture of 3,5-diamino benzhydrazide and BR–18774 resin, with ⅙ of a mole of the hydrazide present per epoxy equivalent of the resin. This hydrazide melts at around 230° C. This hydrazide-epoxy resin mixture was stable at room temperatures.

*Example XVII*

The dihydrazide of m-benzene-bis-oxyacetic acid, which melts at 225° C., was reacted with Epon 864 to produce a rigid casting. This mixture showed no evidence of undergoing any reaction at room temperatures.

*Example XVIII*

The trihydrazide of citric acid was obtained from ethyl citrate as a non-crystalline glass by a procedure analogous to those used to produce the dihydrazides. A sample of about ⅙ mole of this trihydrazide per epoxy equivalent of resin cured the BR–18774 resin, but some bubbles were present in the casting. There was no evidence of reaction between the hydrazide and the epoxy resin at room temperatures.

*Example XIX*

Seventy-six parts of BR–18774 was initially reacted with 20.2 parts of sebacic acid, the proportion of reactants being such that approximately half of the epoxy groups in the resin were linked with the acid to form a higher molecular weight resin with little change in melting point. A sample of 384 grams of this reaction product was blended with 48 grams of isophthalyl dihydrazide. The blend showed no evidence of reaction or increase in viscosity at room temperatures. A sample of the mixture cured to a rigid, tough product in 20 minutes at about 160° C.

*Example XX*

Para-hydroxybenzoic acid was esterified with polyethylene glycol having an average molecular weight of about 200. This ester was reacted with epichlorhydrin, by methods hereinbefore indicated, to obtain a liquid epoxy resin having from 3 to 5 percent oxirane oxygen. A blend of 330 parts of this epoxy resin and 48 parts of isophthalyl dihydrazide appeared to have a prolonged shelf life at room temperatures but cured to a rigid, tough product in 3 hours at 145° C.

*Example XXI*

A composition of 78 parts Cardolite 7019 (a product of the Irvington Varnish & Insulator Division of Minnesota Mining and Manufacturing Company derived from cashew nut shell liquid and containing two glycidyl ether radicals each attached to a phenolic ring which rings in turn are joined by a long aliphatic chain), 9 parts isophthalyl dihydrazide, 3 parts Benton-34, and 1.5 parts diethylaminopropylphthalimide-salicylic acid salt cured in 40 minutes at 160° C. to a brittle product.

What is claimed is:

1. A composition of matter having a prolonged shelf life at normal room temperatures and capable of rapidly curing to a hard, tough state at moderately elevated temperatures comprising a blend of an epoxy resin having an average of more than one 1,2-epoxy group per average molecular weight and a polyfunctional hardener compound of the formula:

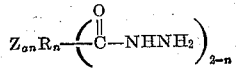

wherein R is a polyvalent organic radical having $v$ valences, each of which valences emanates from a carbon atom, $n$ is a member of the group consisting of zero and the integer 1, each Z is a member of the group consisting of the amino, hydroxyl, and carboxylic acyl hydrazide groups, and $a$ is equal to $v-1$.

2. A composition of matter having a prolonged shelf life at normal room temperatures and capable of rapidly curing to a hard, tough state at moderately elevated temperatures comprising a blend of an epoxy resin having an average of more than one 1,2-epoxy group per average molecular weight and a polyfunctional hardener compound of the formula:

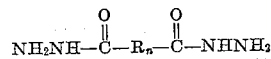

wherein R is a divalent hydrocarbon radical of at least 4 carbon atoms and $n$ is a member of the group consisting of zero and the integer 1.

3. The hard, tough, heat-resistant, heat-cured product of the composition of matter as claimed in claim 1.

4. An article of manufacture comprising a body having a surface and adherently attached thereto the heat-cured resinous product of the composition of matter as claimed in claim 1.

5. The method of making a hard, tough heat-resistant product consisting essentially of blending an epoxy resin having an average of more than one 1,2-epoxy group per average molecular weight with a polyfunctional organic hardener compound and heating the blend to a temperature and for a time sufficient to provide the desired hardening, the said polyfunctional hardener compound having the formula:

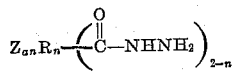

wherein R is a polyvalent organic radical having $v$ valences, each of which valences emanates from a carbon atom, $n$ is a member of the group consisting of zero and the integer 1, each Z is a member of the group consisting of the amino, hydroxyl, and carboxylic acyl hydrazide groups, and $a$ is equal to $v-1$.

6. The method of uniting two solid surfaces which includes the steps of: blending together components consisting essentially of (1) an epoxy resin having an average of more than one 1,2-epoxy group per average molecular weight and (2) a polyfunctional organic hardening agent, applying a thin layer of the mixture to at least one of the surfaces, bringing the surfaces together while the layer remains fluid, and heating the composite until the layer has solidified and hardened, the said polyfunctional hardening agent having the formula:

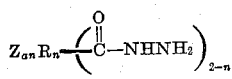

wherein R is a polyvalent organic radical having $v$ valences, each of which valences emanates from a carbon atom, $n$ is a member of the group consisting of zero and the integer 1, each Z is a member of the group consisting of the amino, hydroxyl, and carboxylic acyl hydrazide groups, and $a$ is equal to $v-1$.

7. A composite multi-part article, each of said parts having a solid surface, said surfaces being bonded together by the heat-cured product of the composition of matter as claimed in claim 1.

8. As a new product of manufacture, a thin, flexible, self-sustaining sheet material capable of being formed in rolls for storage and transportation and comprising a flexible, porous, fibrous web impregnated with a rapidly thermosetting resinous composition and characterized by the resinous composition being a blend of components comprising: (1) an epoxy resin having at least one 1,2-epoxy group per average molecular weight and (2) a polyfunctional hardener compound of the formula:

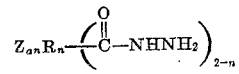

wherein R is a polyvalent organic radical having $v$ valences, each of which valences emanates from a carbon atom, $n$ is a member of the group consisting of zero and the integer 1, each Z is a member of the group consisting of the amino, hydroxyl, and carboxylic acyl hydrazide groups, and $a$ is equal to $v-1$.

9. A composition of matter as in claim 2 wherein the polyfunctional hardener compound is isophthalyl dihydrazide.

10. A composition of matter as in claim 2 wherein the polyfunctional compound is adipyl dihydrazide.

11. A composition of matter as in claim 2 wherein the polyfunctional hardener compound is azelayl dihydrazide.

12. A composition of matter as in claim 2 wherein the polyfunctional hardener compound is sebacyl dihydrazide.

13. A composition of matter having a prolonged shelf life at normal room temperatures and capable of rapidly curing to a hard, tough state at moderately elevated temperatures comprising a blend of (1) epoxy resin having an average of more than one 1,2-epoxy group per average molecular weight, and (2) a polyfunctional hardener compound of the formula:

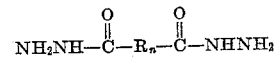

wherein R is a divalent hydrocarbon radical and $n$ is a member of the group consisting of zero and the integer 1.

14. A composition of matter having a prolonged shelf life at normal room temperatures and capable of rapidly curing to a hard, tough state at moderately elevated temperatures comprising a blend of (1) epoxy resin having an average of more than one 1,2-epoxy group per average molecular weight, (2) a polyfunctional hardener compound of the formula:

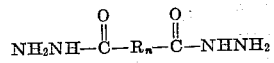

wherein R is a divalent hydrocarbon radical and $n$ is a member of the group consisting of zero and the integer 1, and (3) a particulate filler.

References Cited in the file of this patent

UNITED STATES PATENTS

| | | |
|---|---|---|
| 2,371,133 | Graenacher | Mar. 13, 1945 |
| 2,589,245 | Greenlee | Mar. 18, 1952 |
| 2,668,154 | Orth | Feb. 2, 1954 |

OTHER REFERENCES

Whitmore: "Organic Chemistry," 2nd ed., D. Van Nostrand Co., Inc. New York, 1951, page 299. (Copy in Sci. Lib.)

Hackh's Chemical Dictionary, 2nd ed., page 346. (Copy in Sci. Lib.)